United States Patent
Duggal et al.

(10) Patent No.: US 9,969,837 B2
(45) Date of Patent: May 15, 2018

(54) POLYURETHANES MADE USING MIXTURES OF TERTIARY AMINE COMPOUNDS AND LEWIS ACIDS AS CATALYSTS

(75) Inventors: Rajat Duggal, Pearland, TX (US); Nathan Wilmot, Missouri City, TX (US); Richard J. Keaton, Pearland, TX (US); Duane R. Romer, Midland, MI (US); Peter M. Margl, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days. days.

(21) Appl. No.: 14/240,596

(22) PCT Filed: Aug. 29, 2012

(86) PCT No.: PCT/US2012/052844
§ 371 (c)(1),
(2), (4) Date: Feb. 24, 2014

(87) PCT Pub. No.: WO2013/043333
PCT Pub. Date: Mar. 28, 2013

(65) Prior Publication Data
US 2014/0221594 A1  Aug. 7, 2014

Related U.S. Application Data

(60) Provisional application No. 61/537,110, filed on Sep. 21, 2011.

(51) Int. Cl.
| | |
|---|---|
| *C08G 18/20* | (2006.01) |
| *C08G 18/18* | (2006.01) |
| *C08G 18/16* | (2006.01) |
| *C08G 18/22* | (2006.01) |
| *C08G 18/48* | (2006.01) |
| *C08G 18/66* | (2006.01) |
| *C08G 18/79* | (2006.01) |
| *C08G 18/32* | (2006.01) |

(52) U.S. Cl.
CPC ....... *C08G 18/2063* (2013.01); *C08G 18/161* (2013.01); *C08G 18/163* (2013.01); *C08G 18/18* (2013.01); *C08G 18/222* (2013.01); *C08G 18/225* (2013.01); *C08G 18/3206* (2013.01); *C08G 18/4837* (2013.01); *C08G 18/6674* (2013.01); *C08G 18/797* (2013.01)

(58) Field of Classification Search
CPC .... C08G 18/161; C08G 18/163; C08G 18/18; C08G 18/2063; C08G 18/225; C08G 18/222
See application file for complete search history.

(56) References Cited

U.S. PATENT DOCUMENTS

| | | | |
|---|---|---|---|
| 3,168,497 A | | 2/1965 | Twitchett |
| 3,714,077 A | | 1/1973 | Cobbledick |
| 4,444,704 A | * | 4/1984 | Hira et al. .................. 264/45.5 |
| 5,677,412 A | * | 10/1997 | Drysdale ............... C08G 18/00 528/44 |
| 6,858,655 B1 | * | 2/2005 | Hofmann et al. ............ 521/174 |
| 2006/0293486 A1 | | 12/2006 | Emmrich |
| 2007/0142601 A1 | | 6/2007 | Nodelman |
| 2007/0282089 A1 | * | 12/2007 | Spyrou ............. C08G 18/0895 528/44 |
| 2010/0152373 A1 | * | 6/2010 | Wakabayashi ..... C08G 65/2609 524/588 |
| 2011/0152392 A1 | * | 6/2011 | Van Der Puy ..... C08G 18/1875 521/87 |

FOREIGN PATENT DOCUMENTS

| | | | |
|---|---|---|---|
| EP | 1736489 | | 12/2006 |
| JP | 2008056849 A | * | 3/2008 |
| WO | 2005/058996 A | | 6/2005 |
| WO | WO-2005/058996 | * | 6/2005 ............. C08G 18/22 |

OTHER PUBLICATIONS

Document N_English Translation.*
Novel intramolecular blocked isocyanates as stable one-component systems for poly(urea urethane)s. Keul et al. Polymer 46 (2005, 1459-1465.*

* cited by examiner

*Primary Examiner* — Michael L Leonard

(57) ABSTRACT

Polyisocyanate-based polymers are formed by curing a reaction mixture containing at least one polyisocyanate and at least one isocyanate-reactive compound having at least two isocyanate-reactive groups in the presence of a tertiary amine catalyst having a molecular weight of up to 300 and from 0.01 to 1.0 mole per mole of the tertiary amine compound(s) of a non-protic, non-catalytic, metal-containing Lewis acid.

11 Claims, No Drawings

POLYURETHANES MADE USING MIXTURES OF TERTIARY AMINE COMPOUNDS AND LEWIS ACIDS AS CATALYSTS

This application claims priority from U.S. Provisional Application No. 61/537,110, filed 21 Sep. 2011.

This invention relates to processes for making polymers from polyisocyanates and isocyanate reactive materials. The invention is particularly applicable to making cast polyurethane elastomers.

Many solid or microcellular polyurethane elastomers are manufactured using cast elastomer methods. These elastomers are made by reacting a high equivalent weight polyol and a chain extender material with a polyisocyanate compound. Because it is usually intended to form a highly flexible, rubbery product, the amount of chain extender in the formulation is usually somewhat small. The elastomer is produced by mixing the starting materials and transferring the mixture into a mold where it is cured, usually with application of heat. Some or all of the high equivalent weight polyol may be pre-reacted with the polyisocyanate in a preliminary step to form an isocyanate-terminated prepolymer or quasi-prepolymer. Such a prepolymer is then caused to react with the chain extender and optionally a remaining portion of the high equivalent weight polyol during the molding step.

Open time is very important in cast elastomer processes. Once the starting materials are mixed, they must remain in an uncured, flowable state for several minutes to allow the mixture to be degassed (in most cases) and transferred into the mold. If the reaction proceeds too quickly, the mold may not fill completely and/or flow lines or other defects appear in the parts, which can lead to high reject rates.

Once the mold is filled, however, a rapid cure is wanted, to reduce cycle times and maximize mold usage.

Organomercury compounds are often the catalysts of choice for cast elastomer processes. Organomercury catalysts offer an important combination of attributes that are extremely difficult to duplicate with other catalyst systems. These organomercury catalysts provide a very desirable curing profile in which a long open time is followed by a rapid cure. A second attribute of organomercury catalysts is that they produce polyurethane elastomers that have very desirable physical and mechanical properties.

Mercury catalysts are undesirable from an environmental and worker exposure standpoint, and in many jurisdictions these are being phased out. Therefore, a replacement catalyst system is needed. Such a replacement catalyst system ideally would provide the attributes of organomercury catalysts, including a desirable cure profile, good property development in the product, and good surface appearance.

This invention is in one aspect a process for preparing a polyisocyanate-based polymer, comprising forming a reaction mixture containing at least one polyisocyanate, at least one isocyanate-reactive compound having at least two isocyanate-reactive groups and at least one catalyst, and then curing the reaction mixture to form a polymer, wherein the catalyst comprises a mixture of at least one tertiary amine compound having a molecular weight of up to 300 and from 0.01 to 1.0 mole, per mole of tertiary amine compound(s) having a molecular weight of up to 300, of a non-catalytic, non-protic, metal-containing Lewis acid.

Surprisingly, the presence of the Lewis acid has been found to provide long open times in many polyurethane systems, while still providing for reasonable demold times.

Still more surprisingly, the reactivity of the system can be adjusted through manipulation of the ratio of the Lewis acid to the tertiary amine compound(s). By increasing the ratio of Lewis acid to tertiary amine compound, longer open times (at constant tertiary amine compound level) can be obtained. This allows one to tailor the reactivity of a polyurethane-forming system in a simple manner. Another advantage is that only small amounts of the Lewis acid, relative to the amount of tertiary amine compound(s), are needed to achieve a significant delay in cure.

In addition, polymer properties are obtained that are very similar to those provided by the mercury catalysts.

The invention is also a urethane catalyst comprising tertiary amine compound having a molecular weight of up to 300 at least partially blocked with a non-catalytic, non-protic Lewis acid.

The tertiary amine compound contains at least one tertiary amine group and has a molecular weight of up to 300. The tertiary amine compound may have one or more groups such as hydroxyl, primary amine or secondary amine groups that are reactive towards isocyanate groups, but in preferred embodiments the tertiary amine compound is devoid of such isocyanate-reactive groups.

Representative tertiary amine compounds include trimethylamine, triethylamine, dimethylethanolamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, tetramethylguanidine, 1,4-diazobicyclo-2,2,2-octane, bis(dimethylaminoethyl)ether, bis(2-dimethylaminoethyl)ether, morpholine, 4,4'-(oxydi-2,1-ethanediyl)bis, triethylenediamine, pentamethyl diethylene triamine, dimethyl cyclohexyl amine, N-cetyl-N,N-dimethyl amine, N-coco-morpholine, N,N-dimethyl aminomethyl N-methyl ethanolamine, N,N,N'-trimethyl-N'-hydroxyethyl bis(aminoethyl)ether, N,N-bis(3-dimethylaminopropyl)N-isopropanolamine, (N,N-dimethyl) amino-ethoxy ethanol, N,N,N',N'-tetramethyl hexane diamine, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl(aminoethoxyethyl))((dimethyl amine)ethyl)ether, tris(dimethylamino propyl) amine, dicyclohexyl methyl amine, bis(N,N-dimethyl-3-aminopropyl) amine, 1,2-ethylene piperidine and methyl-hydroxyethyl piperazine. Also useful as the tertiary amine compound are amine-initiated polyether monols and polyols of up to 300 molecular weight, as well as non-emissive catalysts such as those sold as Dabco™ NE30 and Dabco™NE1070.

A preferred type of tertiary amine compound is a bicyclic amidine catalyst. This class of catalysts includes 1,8-diazabicyclo-5.4.0-undecene-7, and substituted bicyclic amidine catalysts such as those represented by Structure I as follows:

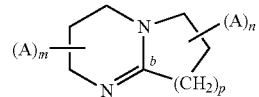

(I)

wherein each A is a group bonded to a ring carbon atom and contains a non-protic nucleophilic group. In structure I, m and n are each independently zero or a positive integer, provided that m+n equals at least one. m+n preferably equals 1 or 2 and more preferably equals 1. m is most preferably zero and n is most preferably 1. p is zero or a positive number, preferably 1, 2 or 3 and more preferably 3. The A group as a whole should be devoid of hydrogen atoms that are reactive towards hydroxyl groups and isocyanate groups. The nucleophilic group contained in the A substituent(s) may be, for example, a tertiary phosphine or tertiary amino group. A specific substituted bicyclic amidine catalyst is 6-(dibutylamino)-1,8-diazabicyclo[5.4.0]undec-7-ene, where the butyl groups may be n-butyl, sec-butyl or t-butyl groups.

The non-catalytic, non-protic metal-containing Lewis acid is a compound of a metal and one or more anions. The Lewis acid is a compound that accepts a lone pair of electrons from a donor molecule. The Lewis acid by itself is not a catalyst for the reaction of an alcohol and an isocyanate group. This lack of catalytic activity, for purposes of this invention, is indicated by a tack-free time of greater than 15 minutes on the catalyst activity screening test indicated in Examples 1 and 2 below, in which 50 micromoles of the Lewis acid but no other polyurethane catalyst is present. The Lewis acid is non-protic, by which it is meant that it does not contain acidic protons, i.e., no protons having a pKa of less than 12 in water at 25° C.

The metal may be, for example, a Group 2 (former IUPAC Group IIA) metal (including, for example, Mg or Ca), a Group 3 (former IUPAC Group IIIA) metal (including, for example, Sc or Y), a Group 4 (former IUPAC Group IVA) metal (including, for example Zr or Hf), a Group 5 (former IUPAC Group VA) metal (including, for example, V or Nb), a Group 13 (former IUPAC Group IIIB) metal (including, for example, Ga), or a lanthanide series (rare earth) metal (including, for example, La, Ce, Pr, Nd, Sm, Eu, Gd, Tb, Dy, Ho, Er, Tm, Yb, and Lu). Zr and Yb are preferred metals.

The anions may be, for example, halogen, alkoxide, aryloxy, amide, alkylsulfonate, trifluoromethylsulfonate (triflate), bis(trialkylsilyl)amide, hexamethyldisilazide, phosphate or hydrocarbyl. It is preferred that the anion is not carboxylate or a phenolate. Two or more different anions may be present.

In some embodiments, some or all of the anions are alkoxide ions. By "alkoxide ion" it is meant a species having the form —O⁻—R, where R is an alkyl group or substituted alkyl group. The alkoxide ion in some embodiments preferably contains from one to 20, more preferably from one to 6 and still more preferably from 2 to 6 carbon atoms. In other embodiments, the R group contains ether linkages and may also contain one or more hydroxyl groups.

Some or all of the anions may also be aryloxy anions, i.e., anions having the form —O⁻—Ar, where Ar is an aromatic group or substituted group.

Some or all of the anions may be amide ions. By "amide" ion, it is meant an anion in which a nitrogen atom bears a negative charge. The amide ion generally takes the form —N⁻(R²)₂, wherein the R² groups are independently alkyl, aryl, trialkylsilyl, triarylsilyl and the like. Any of these groups may contain substituents such as ether.

Some or all of the anions may be hydrocarbyl anions. The hydrocarbyl anion may be aromatic, aliphatic and/or alicyclic. Of the aromatic groups, phenyl groups are preferred. Aliphatic hydrocarbyl groups are preferably alkyl groups, which more preferably contain from 1 to 12, and most preferably from 2 to 8 carbon atoms.

Examples of suitable Lewis acids include, but are not limited to, dibutyl magnesium, butylethyl magnesium, magnesium ethoxide, magnesium bis(hexamethyldisilazide), magnesium triflate; calcium isopropoxide, dibutyl calcium, butylethyl calcium; diethyl zinc, ethyl zinc isopropoxide, zinc methoxide, zinc bis(hexamethyldisilazide); tetrabenzyl hafnium, hafnium tetra-t-butoxide, hafnium tetraisopropoxide isopropanol adduct, hafnium tetra(dimethylamide), hafnium tetra(diethylamide); tetrabenzyl zirconium, zirconium tetra-t-butoxide, zirconium tetraisopropoxide, tetra(dimethylamido) zirconium, zirconium diisopropoxide bis(2,2,6,6-tetramethyl-3,5-heptanedionate), ytterbium triflate, ytterbium triisopropoxide, ytterbium tris-(bis(trimethylsilyl) amide), scandium triflate, scandium isopropoxide, tricyclopentadienyl ytterbium, yttrium triisopropoxide, yttrium isopropoxide oxide, yttrium tris-(bis(trimethylsilyl) amide), samarium isopropoxide, lanthanum isopropoxide, lanthanum tris-(bis(trimethylsilyl)amide), and the like.

From 0.01 to 1.0 mole of the Lewis acid are provided per mole of tertiary amine compound(s). Amounts less than about 0.01 mole/mole provide little effect, whereas amounts larger than about 1.0 mole/mole typically lead to too great of a reduction in reactivity. In general, increasing amounts of the Lewis acid per mole of tertiary amine compound(s) leads to a greater reduction or delay in reactivity. A preferred minimum amount is at least 0.05 moles, and a preferred upper amount is up to 0.75, up to 0.5, up to 0.35 or up to 0.2 moles per mole of tertiary amine compound.

It is often convenient to combine the Lewis acid with the tertiary amine compound(s) prior to forming the reaction mixture that contains at least one polyisocyanate and at least one isocyanate-reactive compound. If the Lewis acid and the tertiary amine compound(s) are liquids, this can be done by simply mixing them together at the desired ratios. If the Lewis acid, tertiary amine compound or both are solids, they may be heated to above their respective melting temperatures and mixed together, or else they may be mixed while dissolved in some suitable solvent. It is also possible to form the mixture in situ in one or more isocyanate-reactive compounds.

It is hypothesized that the Lewis acid blocks tertiary amine groups of the tertiary amine compound(s) and in that manner diminishes or delays the activity of the catalyst. However, the invention is not limited to this or any other theory.

A polymer is prepared in accordance with the invention by forming a mixture of at least one organic polyisocyanate compound, at least one isocyanate-reactive material that reacts at least difunctionally with isocyanate groups, the Lewis acid and the tertiary amine compound, and curing the mixture to form the polymer. The Lewis acid and tertiary amine may be mixed together prior to contacting the organic polyisocyanate compound with the isocyanate-reactive material. Curing is achieved by subjecting the mixture to conditions sufficient for the organic polyisocyanate compound and the isocyanate reactive material to react to form the polymer. The polymer will in most cases contain urethane linkages, urea linkages, allophanate linkages, biuret linkages, isocyanurate linkages, amide linkages, oxazolidone linkages, or some of each type of linkage.

The organic polyisocyanate contains an average of at least 1.5 and preferably at least 2.0 isocyanate groups per molecule. It may contain as many as 8 isocyanate groups per molecule, but typically contains no more than about 4 isocyanate groups per molecule. The organic polyisocyanate may contain as little as 0.5% by weight isocyanate groups, or may contain as much as about 50% by weight isocyanate groups. The isocyanate groups may be bonded to aromatic, aliphatic or cycloaliphatic carbon atoms. Examples of polyisocyanates include m-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate, naphthylene-1,5-diisocyanate, methoxyphenyl-2,4-diisocyanate, diphenylmethane-2,4'-diisocyanate, diphenylmethane-4,4'-diisocyanate, diphenylmethane-2,2'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4,4'-diisocyanate, 4,4',4''-triphenyl methane triisocyanate, a polymethylene polyphenylisocyanate (PMDI), toluene-2,4,6-triisocyanate and 4,4'-dimethyldiphenylmethane-2,2',5,5'-tetraisocyanate. Preferably the polyisocyanate is diphenylmethane-4,4'-diisocyanate, diphenylmethane-2,4'-diisocyanate, PMDI, toluene-2,4-diisocyanate, toluene-2,6-diisocyanate or mixtures thereof. Diphenylmethane-4,4'-diisocyanate, diphenylmethane-2,4'-diisocyanate and mixtures of any two or more thereof are generically referred to as MDI, and all can be used. Toluene-2,4-diisocyanate, toluene-2,6-diisocyanate and mixtures thereof are generically referred to as TDI, and all can be used.

Any of the foregoing isocyanates can be modified to include urethane, urea, biuret, carbodiimide, allophanate, uretonimine, isocyanurate, amide or like linkages. Examples of modified isocyanates of these types include various urethane group and/or urea group-containing prepolymers, some of which are described in more detail below, and so-called "liquid MDI" products, and the like.

A wide range of isocyanate-reactive materials can be used to form the polymer through reaction with the organic polyisocyanate. A suitable isocyanate-reactive material contains at least two hydrogen atoms that are active according to the well-known Zerewitinoff active hydrogen determination test. Isocyanate-reactive groups that contain active hydrogen atoms include aliphatic primary or secondary hydroxyl groups, aromatic hydroxyl groups, aliphatic or aromatic primary or secondary amine groups, thiol (mercapto) groups, carboxylic acid groups, oxirane groups and the like. An isocyanate-reactive material should contain at least two of such isocyanate-reactive groups. The isocyanate-reactive groups on a particular isocyanate-reactive material may be all the same, or may be of two or more different types.

Various types of isocyanate-reactive materials can be used. One of these is water, which is considered to be an isocyanate-reactive material for purposes of this invention as it consumes two isocyanate groups to produce a urea linkage, with elimination of a molecule of carbon dioxide.

Another type of isocyanate-reactive material is a high equivalent weight isocyanate-reactive material that has a molecular weight of at least 250 per isocyanate-reactive group. These high equivalent weight isocyanate-reactive materials are commonly used in making flexible and semi-flexible polyurethane and/or polyurea polymers, which may be non-cellular, microcellular or foam materials. These high equivalent weight materials are also used as flexibilizers or tougheners for rigid foamed and non-foamed polyurethane and/or polyurea polymers.

Various types of high equivalent weight isocyanate-reactive materials are useful, including hydroxy-functional acrylate polymers and copolymers, hydroxy-functional polybutadiene polymers, polyether polyols, polyester polyols, amine-terminated polyethers, and various polyols that are based on vegetable oils or animal fats. Polyether polyols include, for example, polymers of propylene oxide, ethylene oxide, 1,2-butylene oxide, tetramethylene oxide, block and/or random copolymers thereof, and the like. Of particular interest for many high-volume applications are poly(propylene oxide) homopolymers, random copolymers of propylene oxide and ethylene oxide in which the oxyethylene content is, for example, from about 1 to about 30% by weight, ethylene oxide-capped poly(propylene oxide) polymers which contain from 70 to 100% primary hydroxyl groups, and ethylene oxide-capped random copolymers of propylene oxide and ethylene oxide in which the oxyethylene content is from about 1 to about 30% by weight. The polyether polyols may contain low terminal unsaturation (for example, less than 0.02 meq/g or less than 0.01 meq/g), such as those made using so-called double metal cyanide (DMC) catalysts, as described for example in U.S. Pat. Nos. 3,278,457, 3,278,458, 3,278,459, 3,404,109, 3,427,256, 3,427,334, 3,427,335, 5,470,813 and 5,627,120. Polymer polyols of various sorts may be used as well. Polymer polyols include dispersions of polymer particles, such as polyurea, polyurethane-urea, polystyrene, polyacrylonitrile and polystyrene-co-acrylonitrile polymer particles, in a polyol, typically a polyether polyol. Suitable polymer polyols are described in U.S. Pat. Nos. 4,581,418 and 4,574,137.

High equivalent weight isocyanate-reactive polyesters include reaction products of polyols, preferably diols, with polycarboxylic acids or their anhydrides, preferably dicarboxylic acids or dicarboxylic acid anhydrides. The polycarboxylic acids or anhydrides may be aliphatic, cycloaliphatic, aromatic and/or heterocyclic and may be substituted, such as with halogen atoms. The polycarboxylic acids may be unsaturated. Examples of these polycarboxylic acids include succinic acid, adipic acid, terephthalic acid, isophthalic acid, trimellitic anhydride, phthalic anhydride, maleic acid, maleic acid anhydride and fumaric acid. The polyols used in making the polyester polyols preferably have an equivalent weight of 150 or less and include ethylene glycol, 1,2- and 1,3-propylene glycol, 1,4- and 2,3-butane diol, 1,6-hexane diol, 1,8-octane diol, neopentyl glycol, cyclohexane dimethanol, 2-methyl-1,3-propane diol, glycerine, trimethylol propane, 1,2,6-hexane triol, 1,2,4-butane triol, trimethylolethane, pentaerythritol, quinitol, mannitol, sorbitol, methyl glycoside, diethylene glycol, triethylene glycol, tetraethylene glycol, dipropylene glycol, dibutylene glycol and the like. Polycaprolactone polyols are useful. Polymer polyols of various sorts may be used as well.

High equivalent weight amine-terminated polyethers include polymers and copolymers of propylene oxide, in which all or a portion of the terminal hydroxyl groups are converted to amino groups. The conversion to amino groups can be performed in a reductive amination process in which the polyether is reacted with hydrogen and ammonia or a primary amine. Amine-terminated polyethers of this type are commercially available from Huntsman under the trade name Jeffamine®. Another type of amine-terminated polyether is prepared by capping the terminal hydroxyl groups of a polyether with a diisocyanate to produce an isocyanate-terminated intermediate, and then hydrolyzing the isocyanate-terminal groups to form terminal aromatic amine groups.

High equivalent weight isocyanate-reactive materials based on vegetable oils and/or animal fats include, for example, castor oil, hydroxymethyl group-containing polyols as described in WO 2004/096882 and WO 2004/096883, amide group-containing polyols as described in WO 2007/019063, hydroxyl ester-substituted fatty acid esters as described in WO 2007/019051, "blown" soybean oils as described in US Published Patent Applications 2002/0121328, 2002/0119321 and 2002/0090488, oligomerized vegetable oil or animal fat as described in WO 06/116456, hydroxyl-containing cellulose-lignin materials, hydroxyl-containing modified starches as well as the various types of renewable-resource polyols described in Ionescu, *Chemistry and Technology of Polyols for Polyurethanes*, Rapra Publishers 2005.

Another useful class of isocyanate reactive materials includes polyols and aminoalcohols that contain at least three isocyanate-reactive groups per molecule and have a molecular weight per isocyanate-reactive group of up to 249, preferably from about 30 to about 200. These materials may have up to 8 or more isocyanate-reactive groups per molecule. They most typically include no more than one primary or secondary amino group, and two or more primary or secondary hydroxyl groups. This class of isocyanate-reactive materials includes materials that are commonly known as crosslinkers or, because they are commonly used in making rigid polyurethane foams, "rigid polyols". Examples of isocyanate-reactive materials of this type include diethanolamine, triethanolamine, di- or tri(isopropanol) amine, glycerine, trimethylol propane, pentaerythritol, various polyester polyols that have at least three hydroxyl groups per molecule and an equivalent weight of up to 249, and various low equivalent weight polyether polyols that have at least three hydroxyl groups per molecule. The low equivalent weight polyether polyols include, for example, ethoxylates and/or propoxylates of an aromatic diamine such as toluene diamine and phenylene diamine, an aliphatic diamine such as ethylene diamine, cyclohexanedimethanol and the like, or a polyol having at least three hydroxyl groups, such as, for example, glycerine, sucrose, sorbitol, pentaerythritol, trimethylolpropane, trimethylolethane and the like.

Another class of suitable isocyanate-reactive materials includes chain extenders, which for the purposes of this invention means a material having exactly two isocyanate-reactive groups per molecule and an equivalent weight per isocyanate-reactive group of up to 249, especially from 31 to 125. The isocyanate reactive groups are preferably hydroxyl, primary aliphatic or aromatic amine or secondary aliphatic or aromatic amine groups. Representative chain extenders include ethylene glycol, diethylene glycol, triethylene glycol, 1,2-propylene glycol, 1,3-propylene glycol, 1,4-butane diol, 1,6-hexane diol, neopentyl glycol, dipropylene glycol, tripropylene glycol, poly(propylene oxide) diols of up to 249 equivalent weight, cyclohexanedimethanol, poly(ethylene oxide) diols of up to 249 equivalent weight, aminated poly(propylene oxide) diols of up to 249 equivalent weight, ethylene diamine, phenylene diamine, diphenylmethane diamine, bis(3-chloro-4-aminophenyl) methane and 2,4-diamino-3,5-diethyl toluene. A mixture of chain extenders may be used.

The relative amounts of polyisocyanate and isocyanate-reactive materials are selected to produce a high molecular weight polymer. The ratio of these components is typically expressed as "isocyanate index" which for purposes of this invention means 100 times the ratio of isocyanate groups to isocyanate-reactive groups provided by the isocyanate-reactive materials. The isocyanate index is typically at least 50, and may be up to 1000 or more. When flexible or semi-flexible cellular, microcellular or non-cellular polymers are prepared, the isocyanate index is generally from 70 to about 150 and more typically from about 70 to 125. Tighter ranges may be used in specific cases. Rigid polymers such as structural polyurethanes and rigid foams are typically made using an isocyanate index of from 90 to 200. Polymers containing isocyanurate groups are often made at isocyanate indices of at least 150, up to 600 or more.

The reaction of the polyisocyanate with the isocyanate-reactive materials may be performed all at once (a "one-shot" process), or can be conducted in stages through the formation of an isocyanate-terminated prepolymer or quasi-prepolymer which is then reacted with additional isocyanate-reactive material(s) to form the final polymer. The catalyst of the invention can be present during the formation of a prepolymer or quasi-prepolymer, during the reaction of the prepolymer or quasi-prepolymer to form a final polymer, or both stages.

The tertiary amine compound is present in an amount sufficient to provide a commercially acceptable polymerization rate. A typical amount is from 0.001 to 5 parts by weight per 100 parts of isocyanate-reactive materials present in the polymerization process, although amounts may vary depending on the particular polymerization process and the particular reactants that are present. A preferred amount is from 0.1 to 1 part by weight per 100 parts by weight of isocyanate-reactive materials, and a more preferred amount is from 0.2 to 0.5 parts by weight of tertiary amine compound(s) per 100 parts by weight of isocyanate-reactive materials.

A wide variety of polymers can be made in accordance with the invention, through the proper selection of particular polyisocyanates, isocyanate-reactive materials, the presence of optional materials such as are described below, and reaction conditions. The process of the invention can be used to produce polyurethane and/or polyurea polymers of various types, including cast elastomers, flexible or semi-flexible reaction injection molded parts (which may be reinforced and/or contain fillers), rigid structural composites which contain reinforcements and/or fillers, flexible polyurethane foams, which may be made in slabstock and/or molding processes, rigid polyurethane foams, sealants and adhesives (including moisture-curable types), binders such as for polymer concrete or for cushioning material such as playground or sports surfaces, mats and the like, cushion and/or unitary backings for carpet and other textiles, semi-flexible foams, pipe insulation, automotive cavity sealing, automotive noise and/or vibration dampening, microcellular foams such as shoe soles, tire fillers, and the like. Processes for making polyurethane and/or polyureas of all of these types are well known; conventional processing methods for making these products are entirely suitable for use with this invention.

Depending on the particular type of polymer being produced and the needed attributes of the polymer, a wide variety of additional materials may be present during the reaction of the isocyanate compound with the isocyanate-reactive materials. Among these materials are surfactants; blowing agents; cell openers; fillers; pigments and/or colorants; desiccants, reinforcing agents; biocides; preservatives; antioxidants; flame retardants; and the like.

One or more surfactants may be present, especially when some blowing agent is incorporated into the formulation. A surfactant can help to stabilize the cells of the composition as gas evolves to form bubbles. A surfactant can also help to wet filler particles and in that way make it easier to incorporate them into the system. Examples of suitable surfactants include alkali metal and amine salts of fatty acids, such as sodium oleate, sodium stearate, diethanolamine oleate, diethanolamine stearate, diethanolamine ricinoleate and the like; alkali metal and amine salts of sulfonic acids such as dodecylbenzenesulfonic acid and dinaphthylmethanedisulfonic acid; ricinoleic acid; siloxane-oxyalkylene polymers or copolymers and other organopolysiloxanes; oxyethylated alkylphenols (such as Tergitol NP9 and Triton X100, from The Dow Chemical Company); oxyethylated fatty alcohols such as Tergitol 15-S-9, from The Dow Chemical Company;

paraffin oils; castor oil; ricinoleic acid esters; turkey red oil; peanut oil; paraffins; fatty alcohols; dimethyl polysiloxanes and oligomeric acrylates with polyoxyalkylene and fluoroalkane side groups. These surfactants are generally used in amounts of 0.01 to 2 parts by weight based on 100 parts by weight of the polyols. Organosilicone surfactants are generally preferred types. Examples of commercially available surfactants that are useful include Dabco™ DC2585, Dabco™ DC5043 and Dabco™ DC5180 surfactants, available from Air Products, Niax™ U-2000 surfactant, available from GE OSi Silicones, and Tegostab™ B 8681, Tegostab™ B4351, Tegostab™ B8631, Tegostab™ B8707 and Tegostab B8715 surfactants, available from Th. Goldschmidt.

A blowing agent may be present if it is desired to form a cellular or microcellular polymer. Water, which is an isocyanate-reactive material, also functions as a blowing agent if present in sufficient quantities, because it reacts with isocyanate groups to liberate carbon dioxide, which then serves a blowing gas. However, other chemical and/or physical blowing agents can be used instead of or in addition to water. Chemical blowing agents react under the conditions of the elastomer-forming step to produce a gas, which is typically carbon dioxide or nitrogen. Physical blowing agents volatilize under the conditions of the polymer-forming step. Suitable physical blowing agents include various low-boiling chlorofluorocarbons, fluorocarbons, hydrocarbons and the like. Fluorocarbons and hydrocarbons having low or zero global warming and ozone-depletion potentials are preferred among the physical blowing agents.

In addition, a gas such as carbon dioxide, air, nitrogen or argon may be used as the blowing agent in a frothing process.

The amount of blowing agent can vary considerably, depending on the particular blowing agent used and the desired density of the resulting polymer.

Cell openers are often present in flexible foam formulations. Cell openers include high molecular weight (generally 4000-20,000 MW) polyethers, typically having ethylene oxide contents of at least 40%, preferably at least 50% by weight.

One or more fillers may also be present. A filler may help modify the composition's rheological properties in a beneficial way, reduce cost and impart beneficial physical properties to the foam. Suitable fillers include particulate inorganic and organic materials that are stable and do not melt at the temperatures encountered during the polyurethane-forming reaction. Examples of suitable fillers include kaolin, montmorillonite, calcium carbonate, wollastonite, talc, high-melting thermoplastics, glass, fly ash, carbon black, titanium dioxide, iron oxide, chromium oxide, azo/diazo dyes, phthalocyanines, dioxazines, colloidal silica and the like. The filler may impart thixotropic properties. Fumed silica is an example of such a filler. When used, fillers advantageously constitute from about 0.5 to about 30%, especially about 0.5 to about 10%, by weight of the polymer.

Some of the foregoing fillers may also impart color to the polymer. Examples of these include titanium dioxide, iron oxide, chromium oxide and carbon black. Other colorants such as azo/diazo dyes, phthalocyanines and dioxazines also can be used.

Reinforcing agents may also be present. The reinforcing agents take the form of particles and/or fibers that have an aspect ratio (ratio of longest dimension to shortest dimension) of at least 3, preferably at least 10. Examples of reinforcing agents include mica flakes, fiber glass, carbon fibers, boron or other ceramic fibers, metal fibers, flaked glass and the like. Reinforcing agents may be formed into mats or other preformed masses.

It is also possible to include one or more catalysts, in addition to the tertiary amine compound(s). Catalysts, for purposes of this invention, are materials that by themselves (i.e., without the presence of any other catalytic material) produce a tack free time of 15 minutes or less on the catalyst activity screening test described in Examples 1 and 2 below. Suitable such additional catalysts include, for example i) certain tertiary phosphines such as a trialkylphosphine or dialkylbenzylphosphine;

ii) certain chelates of various metals, such as those which can be obtained from acetylacetone, benzoylacetone, trifluoroacetyl acetone, ethyl acetoacetate and the like, with metals such as Be, Mg, Zn, Cd, Pd, Ti, Zr, Al, Sn, As, Bi, Cr, Mo, Mn, Fe, Co and Ni;

iii) certain acidic metal salts of strong acids, such as ferric chloride, stannic chloride, stannous chloride, antimony trichloride, bismuth nitrate and bismuth chloride; strong bases, such as alkali and alkaline earth metal hydroxides, alkoxides and phenoxides;

(iv) certain alcoholates or phenolates of various metals, such as $Ti(OR)_4$, $Sn(OR)_4$ and $Al(OR)_3$, wherein R is alkyl or aryl, and the reaction products of the alcoholates with carboxylic acids, beta-diketones and 2-(N, N-dialkylamino)alcohols;

(v) certain alkaline earth metal, Bi, Pb, Sn or Al carboxylate salts; and (vi) certain tetravalent tin compounds, and certain tri- or pentavalent bismuth, antimony or arsenic compounds.

The reaction mixture preferably contains no Brønsted acid having a pKa of 5.5 or less at 25° C. in water, or if such a Brønsted acid is present, it is present in an amount of no more than 0.5 mole/mole of tertiary amine compound(s), more preferably no more than 0.1 mole/mole of tertiary amine compound(s).

The processing method used to make the polymer is not considered to be critical to the invention, provided that the isocyanate compound and the isocyanate-reactive material(s) are mixed and cured in the presence of the tertiary amine compound/Lewis acid mixture to form the polymer. The curing step is achieved by subjecting the reaction mixture to conditions sufficient to cause the isocyanate compound and isocyanate reactive material(s) to react to form the polymer.

Thus, for example, flexible and semi-flexible polyurethane foam can be made in accordance with the invention in a slabstock or molding process. Flexible polyurethane foams are typically made using one or more polyols having an equivalent weight per hydroxyl group of at least 500 to about 2200. Enough blowing agent is used to produce a foam having a density of from 1 to 8 pounds/cubic foot (16-128 kg/m$^3$), preferably from 1.5 to 4 pounds/cubic foot (24-64 kg/m$^3$). Water is a preferred blowing agent. Mixtures of water and a physical blowing agent can be used. A cross-linker and/or chain extender are often present, preferably a polyol or aminoalcohol crosslinker having a molecular weight per isocyanate reactive group of from about 30 to about 75. Isocyanate indices for making flexible polyurethane foam are typically from 70 to 125, more typically from 85 to 115.

Slabstock foam is conveniently prepared by mixing the foam ingredients and continuously dispensing them into a trough or other region where the reaction mixture reacts, rises freely against the atmosphere (sometimes under a film or other flexible covering) and cures. In common commercial scale slabstock foam production, the foam ingredients (or various mixtures thereof) are pumped independently to a mixing head where they are mixed and continuously dispensed onto a conveyor that is lined with paper or plastic. Foaming and curing occurs on the conveyor to form a foam bun. High resilience slabstock (HR slabstock) foam is made using methods similar to those used to make conventional slabstock foam. HR slabstock foams are characterized in exhibiting a Bashore rebound score of 55% or higher, per ASTM 3574-03.

Molded foam can be made according to the invention by transferring the reactants (isocyanate-reactive material(s)), polyisocyanate, blowing agent (if not included in the isocyanate reactive materials), catalyst/Lewis acid mixture and surfactant) to a closed mold where the foaming reaction takes place to produce a shaped foam. Either a so-called "cold-molding" process, in which the mold is not preheated significantly above ambient temperatures, or a "hot-molding" process, in which the mold is heated to drive the cure, can be used. Cold-molding processes are preferred to produce high resiliency molded foam.

Rigid polyurethane foam can be made in accordance with the invention. Rigid foam can be made in a pour-in-place process, as is often the case when the foam forms a thermal insulation layer in an appliance, cooler or other structure. Rigid foam also can be produced using pouring processes or sheet-forming processes. Rigid polyurethane foams are typically made using polyols and/or aminoalcohols having an average equivalent weight per hydroxyl group of at from about 40 to about 250, preferably from about 50 to about 125. Enough blowing agent is used to produce a foam having a density of from 1 to 8 pounds/cubic foot (16-128 kg/m$^3$), preferably from 1.5 to 4, pounds/cubic foot (24-64 kg/m$^3$). Water is a preferred blowing agent. Mixtures of water and a physical blowing agent can be used. Isocyanate indices for making rigid polyurethane foam are typically from 90 to 200. Indices of from 150 to 600 are often used when isocyanurate foams are to be produced.

Noncellular flexible and semi-flexible polyurethane and/or polyurea molded polymers can be made using various molding processes such as reaction injection molding, so-called SRIM or RRIM processes, various spray molding methods, and the like. In these systems, the isocyanate-reactive material is typically a mixture that includes one or more polyols and/or polyamines having a molecular weight per isocyanate-reactive group of at least 500, preferably at least 1200, to about 3000, preferably to about 2500, and at least one chain extender. Blowing agents are usually absent or used in very small amounts, so that the density of the resulting polymer is at least 500 kg/m$^3$. Isocyanate indices are typically from 90 to 125, preferably from 95 to 115.

The tertiary amine/Lewis acid combination is especially useful in processes in which a delayed cure is needed due to processing constraints or for other reasons. Examples of these processes include certain sealant and adhesive applications, certain carpet backing or other textile-backing applications, and certain cast elastomer processes. Sealants and adhesives are often required to have an "open time" of from 2 to 60 minutes or more, to allow the sealant to be dispensed and the substrate(s) brought into position. Similarly, an open time is often required in carpet backing and other textile backing processes, because the reaction mixture must remain flowable long enough for it to be spread across the surface of the carpet or textile and gauged to a needed thickness. Cast elastomer processes often need a significant open time to allow degassing or frothing and for mold filling. In all of these processes, it is preferable to obtain a rapid cure after the necessary open time has passed.

Carpet and other textile cushion backings can be made in accordance with the invention via a mechanical frothing process. In such processes, air, nitrogen or other gas is whipped into the reaction. The frothed reaction mixture is then typically applied to a substrate where it is permitted to cure to form an adherent cellular layer. Such textile-backing processes are described, for example, in U.S. Pat. Nos. 6,372,810 and 5,908,701.

Cast elastomers are generally made using a prepolymer or quasi-prepolymer as the isocyanate-reactive compound. The prepolymer or quasi-prepolymer is prepared by reacting an excess of a polyisocyanate with at least one polyol that has a molecular weight of at least 400, preferably at least 800. The polyol(s) may have a molecular weight as high as about 12,000. A preferred molecular weight is up to 4000 and a more preferred molecular weight is up to 2000. The polyol(s) used in making the prepolymer or quasi-prepolymer preferably have an average of from 1.8 to 3.0, preferably from 1.8 to 2.5 and still more preferably about 1.9 to 2.2 hydroxyl groups per molecule.

A low (up to 300) molecular weight diol may be used to make the prepolymer or quasi-prepolymer, in addition to the foregoing ingredients. This low molecular weight diol preferably has a molecular weight of from 62 to 200. Examples of the low molecular weight diol include ethane diol, 1,2- or 1,3-propane diol, diethylene glycol, dipropylene glycol, triethylene glycol, tripropylene glycol, cyclohexanedimethanol, and the like. This material is usually used in small amounts, if at all. If used in making the prepolymer or quasi-prepolymer, from 1 up to 25 parts by weight thereof may be used per 100 parts by weight of the polyol(s) that have a molecular weight of 400 or more.

The polyisocyanate used to make the prepolymer or quasi-prepolymer preferably contains an average of from 1.8 to 3.5, more preferably from 1.8 to 2.5 isocyanate groups per molecule and an isocyanate content of at least 25% by weight. Aliphatic polyisocyanates are preferred when light stability is needed. In other cases, TDI, MDI or an MDI derivative is often useful. MDI may be the 2,2'-, 2,4'- or 4,4'-isomer, with the 4,4'-isomer, or mixtures of the 4,4'- and 2,4'-isomer, being preferred. "Derivatives" of MDI are MDI that has been modified to include urethane, urea, biuret, carbodiimide, uretonimine or like linkages, and which have an isocyanate content of at least 25% by weight.

About two equivalents of the polyisocyanate are used per equivalent of the diol(s) to make a prepolymer. More than two equivalents of the polyisocyanate, typically at least 2.2 equivalents, are used per equivalent of the diol(s) used to make a quasi-prepolymer. The resulting product includes molecules formed by capping the diol(s) with the polyisocyanate and, in the case of quasi-prepolymer, some quantity of unreacted polyisocyanate. The prepolymer or quasi-prepolymer should have an isocyanate content of at least 4%, and preferably at least 8% by weight. The isocyanate content should not exceed 20% and preferably does not exceed 18% by weight. The prepolymer or quasi-prepolymer should contain an average of from about 1.9 to about 2.5, preferably from 1.9 to 2.3 and more preferably from 2.0 to 2.2 isocyanate groups per molecule.

The reaction to produce the prepolymer or quasi-prepolymer can be catalyzed. The catalyst may be a mixture of tertiary amine and Lewis acid in accordance with this invention.

A cast elastomer is formed by mixing the prepolymer or quasi-prepolymer with a chain extender and/or mixture of chain extender and at least one polyol having a hydroxyl equivalent weight of at least 250, preferably at least 500, and allowing the mixture to cure in the presence of the tertiary amine compound/Lewis acid mixture in a mold. The mold may be open or closed. A preferred polyol for this application is an ethylene oxide-terminated polypropylene oxide diol or triol, or a mixture thereof with at least one poly (propylene oxide) homopolymer diol or triol. The equivalent weights of the polyol(s) in this application may be up to 3000, preferably up to 2000. The average functionality of the polyol(s) is preferably from about 2 to about 3, more preferably from about 2 to about 2.3.

The chain extender may constitute from 2 to 100%, preferably from 4 to 50 and still more preferably from 4 to 25%, of the combined weight of the combined weight of chain extender(s) and polyols having a hydroxyl equivalent weight of at least 250.

To prepare the cast elastomer, the starting materials are generally mixed in ratios that produce an isocyanate index of at least 70 to about 130. A preferred isocyanate index is from 80 to 120, and a more preferred index is from 90 to 110.

The curing conditions are not generally considered to be critical provided that the mixture cures adequately. The components or the mixture may be preheated before being introduced into the mold. The mold may be preheated. It is usually necessary to cure the mixture at elevated temperature; for that reason the filled mold is generally heated in an oven or other suitable apparatus. Mold temperatures may be from 40 to 90° C. Curing times can range from as little as one minute to 60 minutes or more. After curing at least to the extent that the resulting elastomer can be removed from the mold without permanent damage or permanent deformation, the part can be demolded. If necessary, the part can be post-cured at an elevated temperature to complete the cure.

The elastomer will of course take the shape of the internal cavity of the mold; therefore the mold is designed to produce a part having the desired external shape and dimensions. A wide range of elastomeric parts can be produced, including gaskets, bushings, wheels, belts, and the like. However, shoe soles are an application of particular interest. The shoe sole may be, for example, a midsole, an insole, and outsole, or an integrated sole that performs two or more of these functions.

The cast elastomer may be produced at a density of as low as about 500 kg/m$^3$ by frothing the reaction mixture before curing it, or by including a blowing agent in the formulation. Suitable frothing methods are described in U.S. Pat. Nos. 3,755,212; 3,849,156 and 3,821,130. Frothing can be performed to produce microcellular cast elastomers having a density of about 300 kg/m$^3$ or higher, especially about 500 kg/m$^3$ or higher (such as shoe soles, for example). Substantially non-cellular cast elastomers may be produced using no blowing agent or frothing.

In cast elastomer processes, the mixture of tertiary amine compound(s) and Lewis acid often provides a long open time followed by a rapid cure. The physical properties of the resulting elastomer are often comparable to those obtained using conventional mercury catalysts.

The following examples are provided to illustrate the invention but are not intended to limit the scope thereof. All parts and percentages are by weight unless otherwise indicated.

EXAMPLES 1-2 AND COMPARATIVE SAMPLE A

Catalyst activity screening test: A polyol mixture having a hydroxyl equivalent weight of 330 is formed from 1,4-butanediol and a 6000-molecular weight, nominally trifunctional polyether polyol obtained by adding propylene oxide and then ethylene oxide to glycerin in the presence of potassium hydroxide catalyst. The polyether polyol has a hydroxyl number of 26.0-29.0, a primary hydroxyl content of about 80%, a water content of no more than 0.06 weight percent, an acid number of no more than 0.05, and a pH (measured in 1 part of water and 10 parts of methanol) of 8.0-9.5 and a viscosity of 1060-1200 cSt at 25° C. 7 grams of the polyol mixture are added to a vial, followed by the catalyst, Lewis acid and/or catalyst/Lewis acid mixture. The mixture is stirred by hand for one minute. To this are added 3.5 g of a 160.1 isocyanate equivalent weight uretonimine-modified diphenylmethane diisocyanate that has an average of 2.1 isocyanate groups per molecule, a viscosity of 125 mPa·s at 25° C. and an acidity (as % HCl) of 0.0013. The mixture is again mixed by hand for one minute, and the vial is then placed in an insulated foam block. Tack-free time is determined by touching a spatula to the surface of the reaction mixture at intervals of a few seconds; tack-free time is the earliest time at which the spatula comes away clean from the surface. On this test, a material is considered to be non-catalytic if, when 50 micromoles of the material is present in the absence of any other catalyst, the reaction mixture exhibits a tack-free time in excess of 15 minutes.

For Example 1, the catalyst is a solution prepared by dissolving 0.25 g (1.64 mmol) of 1,8-diazabicyclo-5,4,0-undecene-7 (DBU) in 0.615 g of 2-methoxyethanol, and then adding 0.10 g (0.16 mmol) of ytterbium triflate and stirring until dissolved. The mole ratio of Lewis acid to DBU catalyst is about 0.1:1. Enough of this catalyst solution is added to provide 86.3 micromoles of DBU into the reaction mixture.

For Example 2, the catalyst is a solution prepared by dissolving 0.5 g (3.28 mmol) of DBU in 0.615 g of 2-methoxyethanol, and then adding 0.27 g (0.44 mmol) of ytterbium triflate and stirring until dissolved. The mole ratio of Lewis acid to DBU catalyst is about 0.13:1. Enough of this catalyst solution is added to provide 75.2 micromoles of DBU into the reaction mixture.

For Comparative Sample A, the catalyst is a solution of 0.5 g DBU in 1 g of diethylene glycol and 0.5 g of 2-methoxyethanol. Enough of this catalyst solution is added to provide 77.6 micromoles of DBU into the reaction mixture.

The tack-free times for Examples 1 and 2 and Comparative Sample A are as indicated in Table 1.

TABLE 1

| Designation | Mole-% Lewis acid based on DBU catalyst | Micromoles DBU catalyst added | Tack-free time, minutes:seconds |
|---|---|---|---|
| A | 0 | 77.6 | 3:55 |
| 1 | 10 | 86.3 | 4:35 |
| 2 | 13 | 75.2 | 6:20 |

The results in Table 1 indicate the effect of adding small amounts (relative to tertiary amine compound) of a non-catalytic, non-protic Lewis acid. Even small amounts of the Lewis acid lead to significant increases in tack-free time. Furthermore, these results indicate that tack-free time can be adjusted towards a target value by adjusting the amount of the Lewis acid that is provided.

EXAMPLES 3 AND 4 AND COMPARATIVE SAMPLES B AND C

General method: A mixture of 12.2 grams of 1,4-butanediol and 87.8 grams of the polyether polyol described in the previous examples is prepared. The polyol mixture is placed into a plastic cup suitable for use in a Flaktek™ Speedmixer, along with the catalyst. The catalyst is dispersed into the polyol mixture on the Speedmixer, and the resulting blend is then allowed to stand until it returns to room temperature. 50 grams of the isocyanate described in previous examples is then mixed in the Speedmixer. The resulting reaction mixture is poured into a steel mold which is on an 80° C. hot plate. Tack-free time is monitored by touching the surface of the reaction mixture at intervals with a palate knife; tack-free time is the time at which the knife comes away clean from the surface. Demold time is the time after which the material can be removed from the mold without permanent distortion.

The catalyst used in Comparative Samples B and C is a commercially available mercury carboxylate, marketed as Thorcat™ 535 catalyst. In Comparative Sample B, 0.7 gram of this catalyst is used; 1.0 gram is used in Comparative Sample C.

The catalyst used in Example 3 is made by dissolving 0.5 g (3.28 mmole) of DBU in 1.5 g of 1,2-dimethoxyethane, followed by adding and dissolving 0.538 g (1.39 mmol) of zirconium isopropoxide-isopropanol adduct. The mole ratio of Lewis acid to DBU catalyst is about 0.42:1. 0.28 g of this catalyst solution (enough to supply 362 micromoles of DBU catalyst) is used.

The catalyst used in Example 4 is made by dissolving 0.5 g (3.28 mmole) of DBU in 1.23 g of 2-methoxyethanol, followed by adding and dissolving 0.27 g (0.44 mmol) of ytterbium triflate. The mole ratio of Lewis acid to DBU catalyst is about 0.13:1. 0.27 g of this catalyst solution is used (enough to supply 443 micromoles of the DBU catalyst).

Tensile properties are measured from the cured elastomers as follows. Dogbone samples (4.70 mm×21.0 mm) are cut from the moldings and sample thicknesses are measured. Tensile testing is performed on the dogbone samples using a Monsanto Tensometer from Alpha Technologies. Stretching rate is 0.85 mm/s. 100% tensile modulus, ultimate elongation and tensile strength are determined. Results are as indicated in Table 2.

physical properties provided by the Lewis acid/DBU combination are very comparable to those provided by the mercury catalyst; in the case of Example 2, the tensile strength and elongation are both significantly higher. These results indicate that a tertiary amine compound/Lewis acid mixture in accordance with the invention can provide performance very similar to that of the organomercury catalyst.

What is claimed is:

1. A process for preparing a polyisocyanate-based polymer, comprising forming a reaction mixture containing at least one polyisocyanate, at least one isocyanate-reactive compound having at least two isocyanate-reactive groups and at least one catalyst, and then curing the reaction mixture to form a polymer, wherein the catalyst comprises a mixture of at least one tertiary amine compound having a molecular weight of up to 300 and from 0.01 to 1.0 mole, per mole of tertiary amine compound(s) having a molecular weight of up to 300, of a non-catalytic, non-protic, metal-containing Lewis acid selected from one or more of dibutyl calcium, butylethyl calcium, lanthanum isopropoxide, and lanthanum tris-(bis(trimethylsilyl)amide).

2. The process of claim 1, wherein the tertiary amine compound having a molecular weight of up to 300 is one or more of trimethylamine, triethylamine, dimethylethanolamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, tetramethylguanidine, 1,4-diazobicyclo-2,2,2-octane, bis(dimethylaminoethyl)ether, bis(2-dimethylaminoethyl) ether, morpholine, 4,4'-(oxydi-2,1-ethanediyl)bis, triethylenediamine, pentamethyl diethylene triamine, dimethyl cyclohexyl amine, N-cetyl-N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl) aminoethoxy ethanol, N,N,N',N'-tetramethyl hexane diamine, N,N-dimorpholinodiethyl ether, N-methyl imidazole, dimethyl aminopropyl dipropanolamine, bis(dimethylaminopropyl)amino-2-propanol, tetramethylamino bis (propylamine),

TABLE 2

| Property | Comp. Sample B | Comp. Sample C | Example 2 | Example 3 |
|---|---|---|---|---|
| Catalyst | Mercury | Mercury | DBU blocked w/ 0.42 mole/mole Zr isopropoxide-isopropanol adduct | DBU blocked w/ 0.13 mole/mole ytterbium triflate |
| Tack free time, minutes | 6.5 | 4.3 | 3.6 | 3.75 |
| Demold time, minutes | 9.8 | 6.5 | 4.2 | 4.5 |
| Tensile modulus, MPa | 7.25 | 7.15 | 7.05 | 6.90 |
| Elongation, % | 300 | 310 | 370 | 270 |
| Tensile Strength, MPa | 14.1 | 14.3 | 19.3 | 13.4 |

The results in Table 2 show that the Lewis acid/DBU catalyst mixtures provide for good open times (as indicated by tack-free times) followed by a rapid cure (indicated by the demold time). Tack-free times and demold times are shorter than are seen with the mercury catalysts, but more comparable tack free times can be obtained by adjusting the amount of the DBU catalyst, by increasing the ratio of Lewis acid to the DBU catalyst, or some combination of both. The (dimethyl(aminoethoxyethyl))((dimethyl amine) ethyl) ether, tris(dimethylamino propyl) amine, dicyclohexyl methyl amine, bis(N,N-dimethyl-3-aminopropyl) amine, 1,2-ethylene piperidine and methyl-hydroxyethyl piperazine.

3. The process of claim 1 wherein the tertiary amine compound having a molecular weight of up to 300 is a bicyclic amidine or substituted bicyclic amidine.

4. The process of claim 3 wherein the tertiary amine compound is 1,8-diazobicyclo-5.4.0-undecene-7,6-(dibutylamino)-1,8-diazabicyclo[5.4.0]undec-7-ene, or a mixture thereof.

5. The process of claim 1 wherein the reaction mixture contains from 0.05 to 1.0 moles of the non-catalytic, non-protic metal-containing Lewis acid per mole of the tertiary amine compound(s) having a molecular weight of up to 300.

6. The process of claim 5 wherein the reaction mixture contains from 0.05 to 0.5 moles of the non-catalytic, non-protic metal-containing Lewis acid per mole of the tertiary amine compound(s) having a molecular weight of up to 300.

7. The process of claim 1 wherein the reaction mixture contains from 0.01 to 5 parts by weight of the tertiary amine compound(s) having a molecular weight of up to 300 per 100 parts by weight of the isocyanate-reactive compounds.

8. The process of claim 1 wherein the reaction mixture contains no more than 0.1 mole of a Brønsted acid having a pKa of 5 or less in water at 25° C. per mole of the tertiary amine compound(s) having a molecular weight of up to 300.

9. The process of claim 1 wherein the polyisocyanate-based polymer is a cast elastomer, the polyisocyanate is a prepolymer or quasi-prepolymer and the isocyanate-reactive compound is a chain extender or mixture of chain extender and at least one polyol having a hydroxyl equivalent weight of at least 250.

10. The process of claim 1 wherein the non-catalytic, non-protic metal-containing Lewis acid and the tertiary amine compound(s) having a molecular weight of up to 300 are mixed together prior to contacting the organic polyisocyanate compound with the isocyanate-reactive material.

11. The process of claim 1 wherein the non-catalytic, non-protic, metal-containing Lewis acid—selected from one or more of lanthanum isopropoxide and lanthanum tris-(bis(trimethylsilyl)amide).

* * * * *